United States Patent [19]

Sciola et al.

[11] 4,105,171
[45] Aug. 8, 1978

[54] SAFETY DRIVE CHUCK

[75] Inventors: Joseph Sciola, Upper Saddle River; Gabor Nagy, Clifton, both of N.J.

[73] Assignee: Super Chuck, Inc., Paterson, N.J.

[21] Appl. No.: 804,624

[22] Filed: Jun. 8, 1977

[51] Int. Cl.² .................................... B65H 19/02
[52] U.S. Cl. ......................................... 242/68.4
[58] Field of Search ............... 242/68.4; 279/1 R, 2, 279/2 R; 308/20

[56] References Cited

U.S. PATENT DOCUMENTS

| 3,038,680 | 6/1962 | Rose | 242/68.4 |
| 3,743,203 | 7/1973 | Rancourt | 242/68.4 |
| 3,777,999 | 12/1973 | Sciola | 242/68.4 |

Primary Examiner—Edward J. McCarthy
Attorney, Agent, or Firm—James J. Romano, Jr.

[57] ABSTRACT

A safety drive chuck is disclosed and comprises improved bearing, lubrication, seal, locking ring and key assemblies to increase the operational reliability of the drive chuck. Mounting and maintenance of the chuck are facilitated by relocation of the chuck positioning means on the chuck housing, while chuck operation is facilitated by the smoothing of operative cam surfaces.

4 Claims, 4 Drawing Figures

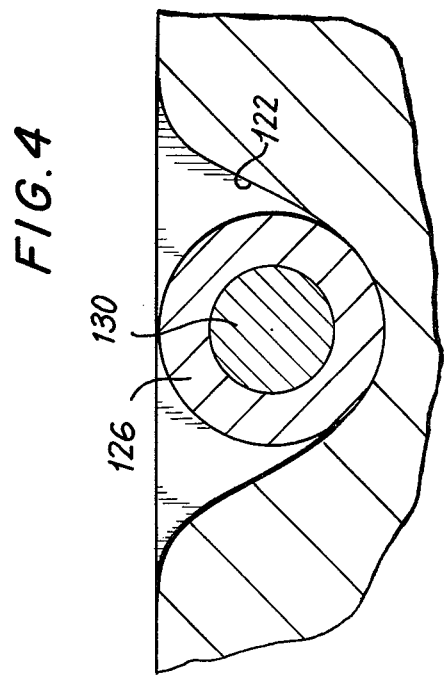
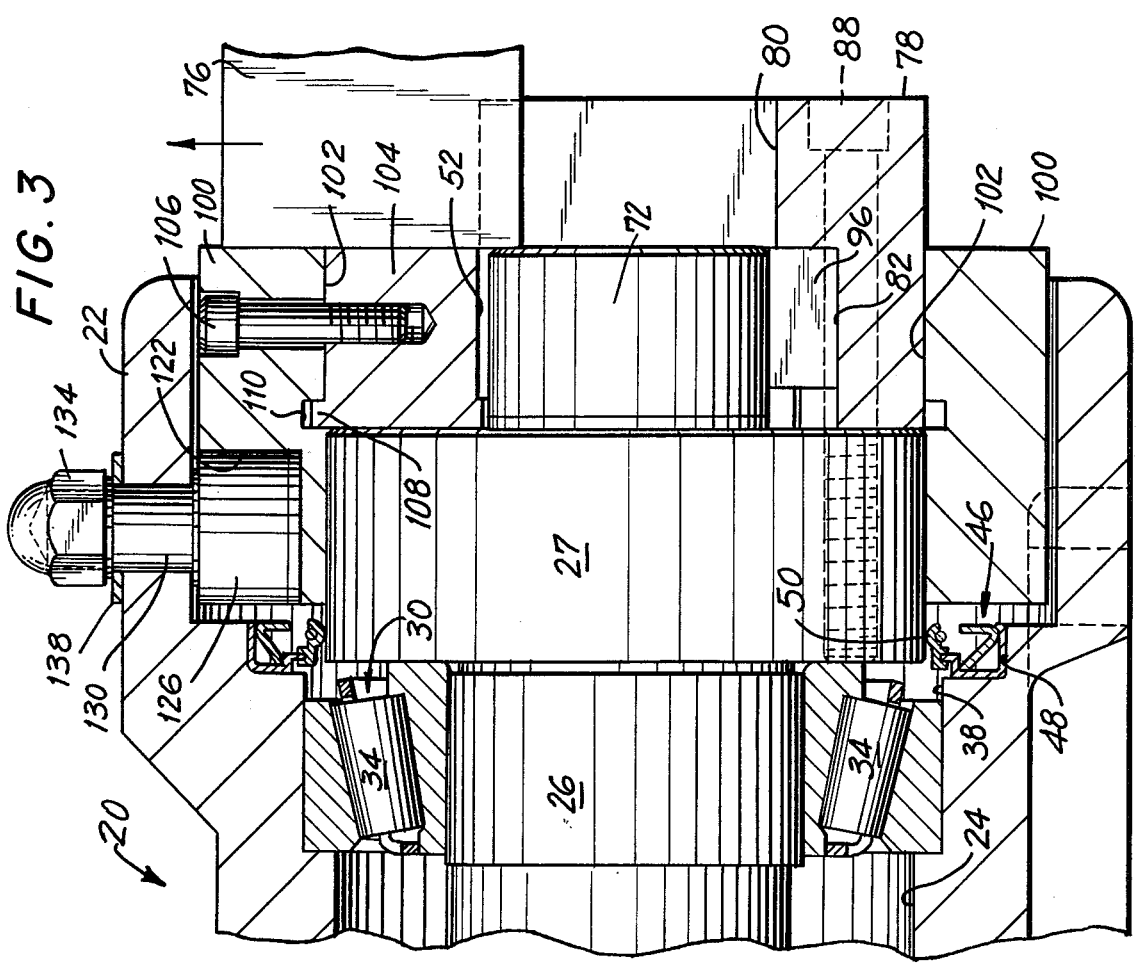

SAFETY DRIVE CHUCK

BACKGROUND OF THE INVENTION

1. Field of the Invention

This invention relates to a new and improved safety drive chuck which is an improvement over the safety drive chuck as disclosed in our U.S. Pat. No. 3,777,999 which issued on Dec. 11, 1973.

2. Description of the Prior Art

Although the safety drive chuck as disclosed in our U.S. Pat. No. 3,777,999 has proven particularly satisfactory regarding the primary safety-insuring function thereof, certain other aspects of the chuck construction have evidenced a need for improvement. More specifically, it may be understood that for use, for example, under conditions wherein high torque loads are applied to the patented drive chuck over relatively extended periods of time, certain operational problems with the chuck bearing assembly have arisen. Too, suitable mounting of the patented drive chuck has, under certain conditions, proven somewhat difficult, as has movement of the chuck locking means between the respective open and closed positions thereof.

OBJECTS OF THE INVENTION

It is, accordingly, an object of this invention to provide a new and improved safety drive chuck having all of the advantages of our safety drive chuck as disclosed in U.S. Pat. No. 3,777,999.

Another object of this invention is the provision of a safety drive chuck as above which is particularly adapted for use under conditions wherein high torque loads are applied to the drive chuck over relatively extended periods of time.

A further object of this invention is the provision of a safety drive chuck as above which is readily and conveniently mountable in particularly secure manner.

A still further object of this invention is the provision of a safety drive chuck as above wherein the chuck locking means are more readily and conveniently moveable between the open and closed positions thereof.

SUMMARY OF THE DISCLOSURE

A new and improved safety drive chuck is disclosed which, while retaining the basic, safety-insuring function of the Safety Drive Chuck as disclosed in our U.S. Pat. No. 3,777,999, comprises improved tapered bearing, lubrication, seal, drive shaft locking ring and key assemblies which better equip the safety drive chuck for operation under high torque loads. In addition, relocation of the positioning means (which enable "opening" of the chuck socket only when the latter is facing upwardly to prevent the driven shaft from falling therefrom) to the upper arcuate half of the generally cylindrical chuck housing enable the positioning of mounting flange means on the lower arcuate half of the chuck housing to facilitate chuck mounting and the maintenance of the positioning means. Also, a smoothing of the positioning means cam surfaces operates to facilitate movement of the drive chuck between the respective "open" and "closed" positions thereof.

DESCRIPTION OF THE DRAWINGS

The above and other objects and significant advantages of our invention are believed made clear by the following detailed description thereof taken in conjunction with the accompanying drawings wherein:

FIG. 3 is a cross-sectional view taken generally along line 3—3 in FIG. 1; and depicts the safety drive chuck in the open position thereof; and FIG. 4 is a cross-sectional view taken generally along line 4—4 in FIG. 1.

DETAILED DESCRIPTION OF THE INVENTION

The new and improved safety drive chuck of this invention is similar in its basic structural and functional characteristics to the safety drive chuck disclosed in our U.S. Pat. No. 3,777,999 issued Dec. 11, 1973 and assigned to the assignee hereof, and the entire disclosure of U.S. Pat. No. 3,777,999 is accordingly hereby incorporated by reference in this specification.

Figure 1:
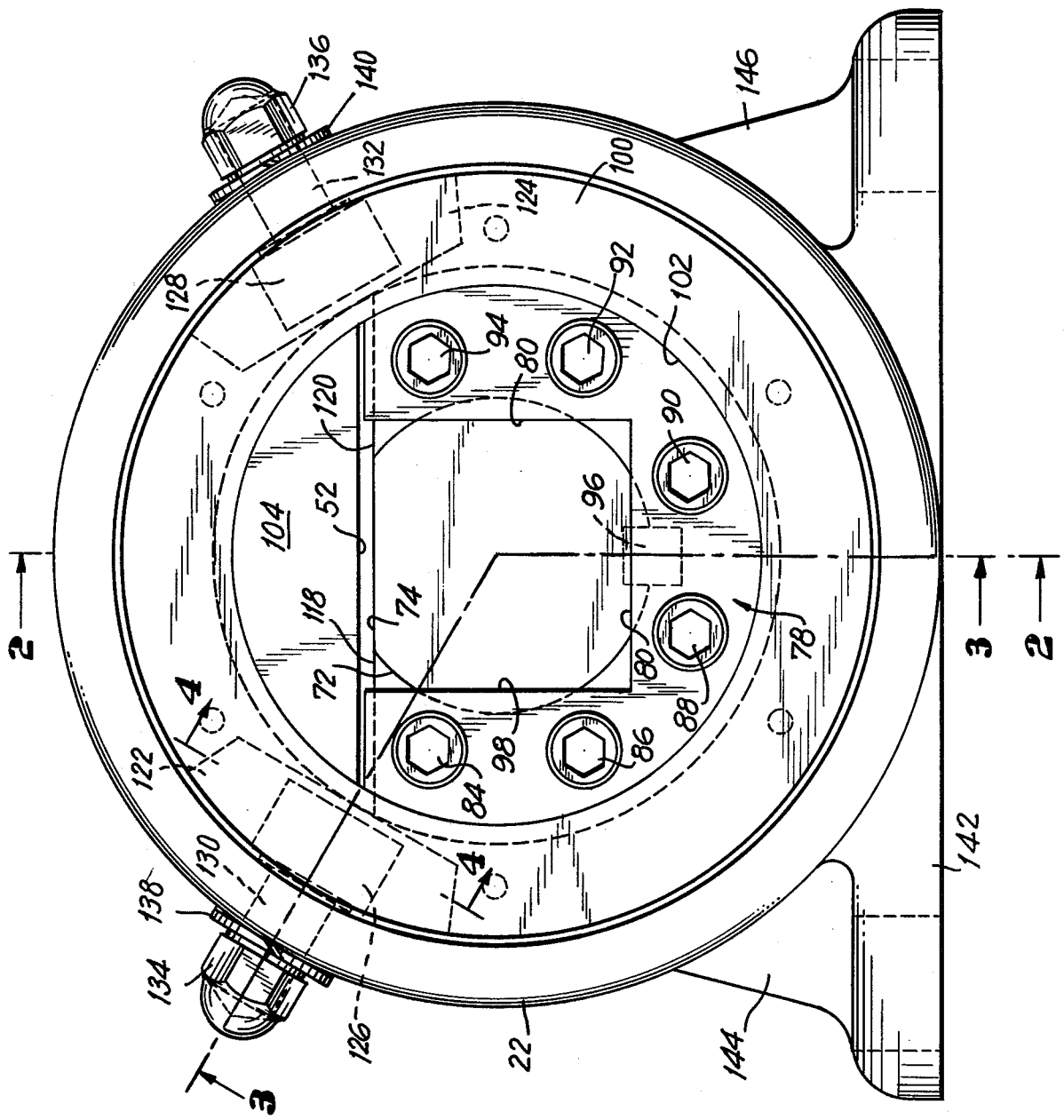
FIG. 1 is a front elevational view of a new and improved safety drive chuck constructed and operative in accordance with the teachings of our invention.
Figure 2:
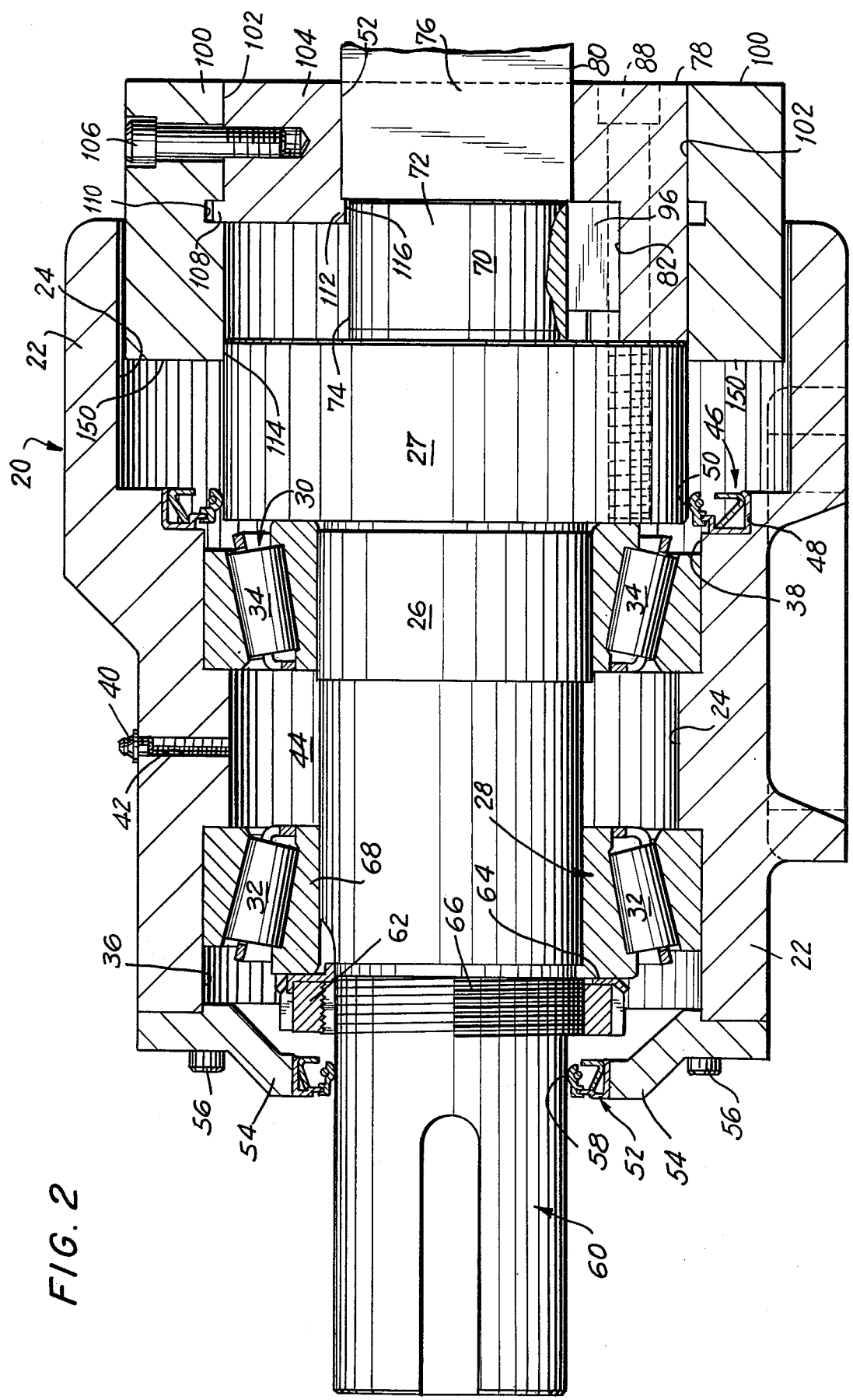
FIG. 2 is a cross-sectional view taken along line 2—2 in FIG. 1; and depicts the safety drive chuck in the closed or locked position thereof.

Referring now to FIGS. 1 and 2, the new and improved safety drive chuck constructed and operative in accordance with the teachings of this invention is indicated generally at 20, and comprises a generally cylindrical housing 22 having a stepped bore 24 extending generally longitudinally thereof. A drive shaft 26 extends as shown through the housing bore 24 and includes a generally cylindrical flange or hub 27 formed as shown adjacent one extremity thereof.

The drive shaft 26 is journalled for rotation in bearing assemblies as generally indicated at 28 and 30, and which respectively comprise tapered roller bearings of the "Timken" type as shown at 32 and 34, respectively. The bearing assemblies 28 and 30 are oppositely disposed as shown in open-sided grooves 36 and 38 in the housing 22 in such manner that longitudinal thrust loads upon drive shaft 26, in either direction, will be effectively borne by said bearing assemblies in manner well understood by those skilled in this art, to thus assure bearing assembly reliability under the most demanding of safety drive chuck operational conditions.

A lubrication fitting is indicated at 40 and communicates as shown with a threaded housing bore 42 to thus enable the periodic supply of an appropriate lubricant to the torous-like space 44 formed between the drive shaft 26 and the wall of the housing bore 24, and thus to the bearing assemblies 28 and 30.

A front seal is indicated generally at 46 and is disposed as shown in an open-sided mounting grove 48 formed in the housing 22. The seal 46 comprises a seal ring 50 which extends as shown into surface contact with the adjacent periphery of the generally cylindrical drive shaft hub 27 to prevent the escape of lubricant from the bearing assembly 30 in the direction of the hub, and to prevent the entry of foreign materials in the nature of abrasive grit or the like into said bearing assembly.

A rear seal is indicated generally at 52 and is supported as shown from a generally circular, rear housing plate 54 which is in turn attached to housing 22 by attachment screws 56. The rear seal 52 comprises a seal ring 58 which extends as shown into surface contact with the adjacent periphery of the appropriately splined end 60 of drive shaft 26 to prevent the escape of lubricant from the bearing assembly 28 in the direction of said splined, drive shaft end, and to prevent the entry of foreign materials as above into the bearing assembly.

A locknut is indicated at 62 and a lockwasher is indicated at 64. The locknut 62 is screwed as shown over an appropriately threaded portion 66 of the drive shaft 26 to firmly compress the lockwasher 64 between said locknut and the adjacent, shaft-carried race 68 of the bearing assembly 28.

The drive shaft 26 extends beyond hub 27 to terminate in a shaft extension 70 which includes a curved surface 72, and a flat surface 74 which functions to support in part a driven shaft 76 and transmit torque from the drive shaft 26 thereto as described in detailed herein below.

A generally U-shaped driven shaft support and locking member is indicated generally at 78 and comprises an open-ended, stepped bore 80 extending therethrough. One section or half 82 of the bore 80 is of curved configuration and is shaped and dimensioned in part in the manner of the curved surface 72 (FIG. 1) of the extension 70. Accordingly, the support and locking member 78 may be fitted over said extension piece as shown and attached to the hub 27 by six, spaced attachment screws as indicated at 84, 86, 88, 90, 92 and 94, respectively; it being understood that the depth of the curved section 82 of the bore 80 is substantially equal to the thickness of the extension 70. In addition, a key 96 of not insubstantial dimension extends as shown in keyways provided therefore in the support and locking member 78 and the extension piece 70 to thus, in conjunction with the six attachment screws 84, 86, 88, 90, 92 and 94, provide for the particularly strong attachment of the support and locking member 78 to the drive shaft 26 and insure the satisfactory and reliable transmission of high torque loads therebetween.

The other section or half of the bore 80 is of the depicted generally rectangular configuration and forms an open-ended rectangular socket 98. The relevant end of the driven shaft 76 is also of rectangular configuration, and is dimensioned to fit as shown in FIG. 2 within the open-ended rectangular socket 98 to thus provide for secure, driven rotation of the driven shaft 76 by the support and locking member 78.

A generally cylindrical locking collar is indicated at 100 and comprises a bore 102 extending generally centrally thereof. A driven shaft locking member is indicated at 104 and is fixedly positioned as shown within the collar bore 102 by a support and positioning screw 106 which extends as shown through the collar 100 into the locking member 104. In addition, a projection 108 is formed as best seen in FIG. 2 at the upper inner edge of the locking member 104 and extends as shown into a complementally shaped arcuate groove 110 in the locking collar 100 to insure the proper location of the locking member 104 relative to the locking collar 100. A collar holding ridge 112 is formed as best seen in FIG. 2 at the lower inner edge of the shaft locking member 104 and functions to hold the locking collar 100 in position.

The locking member 104 includes a flat, shaft locking surface. The bore 102 in the locking collar 100 is dimensioned so that the collar fits somewhat smugly over the periphery of the drive shaft hub 27 as indicated at 114 in FIG. 2, and over the curved portion of the periphery of the support and locking member 78, with freedom for slidable movement relative thereto.

The flat surface 116 of the collar holding ridge 112 extends into close proximity with the flat surface 74 of the shaft extension 70, and into surface contact with the respective flat surfaces 118 and 120 of the support and locking member 78 which are formed thereon to either side of the bore 80 as best seen in FIG. 1. As a result, it will be readily understood that the locking collar 100 will be rotatable with the drive shaft 26.

Spaced, arcuate cams are formed as indicated in phantom at 122 and 124 in FIG. 1 in the inner edge of the locking collar 78. Spaced cam followers 126 and 128 are supported as shown from support shafts 130 and 132 which extend through housing 22 and are secured thereto by cap nuts 134 and 136, and lock washers 138 and 140. The cams 122 and 124 are spaced by less than 180° or, for example, by approximately 120°, on the inner edge of the locking collar 78; while the respective support shafts 130 and 132 which support the cam followers 126 and 128 are, of course, spaced by a like number of degrees on the housing 22 to thus insure precise alignment between said cams and cam followers with the locking member 78 rotated to the position thereof of FIG. 1.

Of particular significance regarding the profiles of the cams 122 is the fact that the same have been modified somewhat, as best seen in FIG. 4 for cam 122, by slight increase in the respective arcuate extents thereof, to provide relatively gradual entry and exit cam ramp portions and accordingly greatly facilitate the longitudinal movement of the cams, and thus the locking collar 78, relative to the cam followers 126 and 128 and attendant movement of the locking collar 78 into the closed or locked position thereof as depicted in FIG. 2.

Of particular significance regarding the cam follower support shafts 130 and 132, and the cap nuts 134 and 136, is the fact that the same are now located at the upper arcuate half of the housing 22 to thus leave the lower portion of the latter free for the attachment of mounting flange means thereto and thus greatly facilitate the mounting of the new and improved safety drive chuck 20 of this invention. As a result, a suitable mounting flange as indicated at 142, and including reinforcing ribs 144 and 146, may now be formed integrally with the housing 22 at the bottom of the latter, without interference from or with said cam follower support shafts or cap nuts, to thereby provide for the particularly sturdy and convenient mounting of the safety drive chuck 20. In addition, and since said cam follower support shafts and cap nuts are now located at the upper portion of the housing 20, it will be readily understood that access thereto, and to the cam followers, for periodic inspection and/or maintenance and the like, with the safety drive chuck operatively mounted in situ, is greatly facilitated.

The shaft locking collar 100 is slidable on the hub 27 and the support and locking member 78 from an open position as seen in FIG. 3 to a closed or locked position as seen in FIG. 2 wherein the flat surface 52 of the shaft locking member 104 overlies the open-ended rectangular bore section 80 in the shaft support and locking member 78 to thereby provide a closed rectangular socket for the support and drive of the rectangular end of driven shaft 76 and prevent the lifting, or other transverse movement, of the driven shaft end from the closed socket. Conversely, with the shaft locking collar 100 moved to the left from the closed or locked position of FIG. 2 to the open position of FIG. 3, it will immediately become clear that the rectangular end of driven shaft 76 can be readily and conveniently be removed by lifting from the then open-ended rectangular socket or bore section 80 in the shaft support and locking member 78.

Since the basic, safety-insuring operation of the safety drive chuck 20 is described in detail in our prior U.S. Pat. No. 3,777,999, such detailed description will not be unnecessarily repeated here. It will, however, be made clear that the respective extents and dispositions of the cams 122 and 124 as are formed in the inner edge of the locking collar 100, and of the cam followers 126 and 128, are such that slidable movement of the locking collar 100, and accordingly of the shaft locking member 104 which is fixedly secured thereto by attachment screw 106, into the open positions thereof of FIG. 3, is rendered impossible due to the abutments of the cam followers 126 and 128 against the un-cammed portions of the accurate surface 150 of the inner edge of locking collar 100 unless the latter is rotated to substantially the position thereof of FIG. 1 wherein the open end of rectangular socket 98 in the shaft support and locking member 78 faces substantially upward. As a result, inadvertent opening of the rectangular socket when the same is not facing substantially upward, with attendant and unacceptable possibility of the driven shaft 78 falling therefrom and causing serious injury or death to a worker, is rendered impossible.

Various changes may, of course, be made in the disclosed embodiment of our invention without departing from the spirit and scope thereof as defined in the appended claims.

What is claimed is:

1. A safety drive chuck for the drive of a driven shaft including, housing means, rotatable drive means comprising a rotatable, open-ended socket of a shape which is commensurate with the shape of said driven shaft to provide for the insertion of said shaft into said socket for drive by said drive means, locking means having a generally cylindrical portion and being cooperatively associated with said drive means and said housing means, said locking means being moveable relative to said drive means and said housing means between first locking means-drive means positions wherein said locking means are operable to close said socket and prevent the falling of said drive shaft therefrom, and second locking means-drive means positions wherein said socket remains open, at least two sets of cooperatively associated positioning means on said housing means and said locking means portion, respectively, said positioning means being operable to enable movement of said locking means into said second locking means-drive means position only when said open-ended socket is positioned so that said shaft cannot fall therefrom, said positioning means being spaced by less than 180° on said generally cylindrical locking means portion and on said housing means, said positioning means being disposed on the upper part of said housing means, said housing means comprising spaced, opposed tapered bearing assemblies, means for introduction of a lubricant into the space between said bearing assemblies, and first and second seal means disposed respectively to the sides of said bearings remote from said space, and wherein said drive means comprise a drive shaft which is journalled for rotation in said bearings.

2. A safety drive chuck as in claim 1 wherein, said drive shaft further comprises a locking ring secured thereto adjacent one of said bearing assemblies.

3. A safety drive chuck as in claim 2 wherein, said housing means comprise spaced, opposed tapered bearing assemblies, means for introduction of a lubricant into the space between said bearing assemblies, and first and second seal means disposed respectively to the sides of said bearings remote from said space, and wherein said drive means comprise a drive shaft which is journalled for rotation in said bearings.

4. A safety drive chuck for the drive of a driven shaft including, housing means, rotatable drive means comprising a rotatable, open-ended socket of a shape which is commensurate with the shape of said driven shaft to provide for the insertion of said shaft into said socket for drive by said drive means, locking means having a generally cylindrical portion and being cooperatively associated with said drive means and said housing means, said locking means being moveable relative to said drive means and said housing means between first locking means-drive means positions wherein said locking means are operable to close said socket and prevent the falling of said drive shaft therefrom, and second locking means-drive means positions wherein said socket remains open, at least two sets of cooperatively associated positioning means on said housing means and said locking means portion, respectively, said positioning means being operable to enable movement of said locking means into said second locking means-drive means position only when said open-ended socket is positioned so that said shaft cannot fall therefrom, said positioning means being spaced by less than 180° on said generally cylindrical locking means portion and on said housing means, said positioning means being disposed on the upper part of said housing means, mounting flange means disposed on the lower part of said housing means, said housing means comprising a generally cylindrical portion, and wherein said positioning means are disposed on the upper arcutate half of said housing means portion, and said mounting flange means are disposed on the lower arcuate half of said housing means portion.

* * * * *